United States Patent [19]

Buckley, Jr.

[11] 4,245,862
[45] Jan. 20, 1981

[54] DRAG REDUCER FOR LAND VEHICLES

[76] Inventor: Frank T. Buckley, Jr., 17841 Pond Rd., Ashton, Md. 20702

[21] Appl. No.: 891,061

[22] Filed: Mar. 30, 1978

Related U.S. Application Data

[63] Continuation-in-part of Ser. No. 763,796, Feb. 1, 1977, abandoned, which is a continuation-in-part of Ser. No. 659,517, Feb. 19, 1976, abandoned.

[51] Int. Cl.³ ............................................. B62D 35/00
[52] U.S. Cl. ................................................... 296/1 S
[58] Field of Search ................................. 296/1 S, 91

[56] References Cited

U.S. PATENT DOCUMENTS

| Re. 28,652 | 12/1975 | Bëldfell | 296/1 S |
|---|---|---|---|
| D. 249,783 | 10/1978 | Harpel | D12/16 |
| 2,863,695 | 12/1958 | Stamm | 296/1 S |
| 2,914,231 | 11/1959 | Hornke | 296/1 S |
| 3,309,131 | 3/1967 | Saunders | 296/1 S |
| 3,348,873 | 10/1967 | Saunders | 296/1 S |
| 3,514,023 | 5/1970 | Russell | 296/1 S |
| 3,596,974 | 8/1971 | Adams | 296/1 S |
| 3,695,673 | 10/1972 | Meadows | 296/1 S |
| 3,711,146 | 1/1973 | Madzsar | 296/1 S |
| 3,768,854 | 10/1973 | Johnson | 296/1 S |
| 3,794,372 | 2/1974 | Webb | 296/1 S |
| 3,819,222 | 6/1974 | Woodard | 296/1 S |
| 3,834,752 | 9/1974 | Cook | 296/1 S |
| 3,854,769 | 12/1974 | Saunders | 296/1 S |
| 3,904,236 | 9/1975 | Johnson | 296/1 S |
| 3,929,369 | 12/1975 | Blair | 296/1 S |
| 3,934,923 | 1/1976 | Lissaman | 296/1 S |
| 3,945,677 | 3/1976 | Servais | 296/1 S |
| 3,951,445 | 4/1976 | Tatom | 296/1 S |
| 3,971,586 | 7/1976 | Saunders | 296/1 S |
| 3,972,556 | 8/1976 | Mason | 296/1 S |
| 3,999,796 | 12/1976 | Greene | 296/1 S |
| 4,006,931 | 2/1977 | Groves | 296/1 S |
| 4,018,472 | 4/1977 | Mason | 296/1 S |
| 4,079,984 | 3/1978 | Powell | 296/91 |

FOREIGN PATENT DOCUMENTS 2550726 5/1977 Fed. Rep. of Germany.

*Primary Examiner*—Robert R. Song
*Attorney, Agent, or Firm*—Kenyon & Kenyon

[57] ABSTRACT

A drag reducing device adapted to be mounted on the roof of the cab portion of a land vehicle including a trailing body for reducing aerodynamic drag. The device comprises a streamlined fairing including a bottom portion, a rear portion, and a continuous contoured surface extending widthwise and upwards from the bottom portion at the front of the fairing to the rear portion. The contoured surface has a top portion and side portions on either side of the longitudinal axis of the fairing which abut at their respective boundaries. The top portion has at least a substantially horizontal segment the tangential plane of which is inclined with respect to the horizontal at an angle which is at least equal to zero. The side portions diverge with respect to each other toward the rear portion and have substantially vertical segments which diverge with respect to the longitudinal axis of the fairing at an angle which is at least zero. The substantially horizontal segment of the top portion is located uppermost with respect to the bottom portion and the substantially vertical segments of the side portions are located furthest from the longitudinal axis of the fairing.

Fairings and air deflectors having horizontal and vertical variable release angle tabs hinged thereon are also disclosed.

15 Claims, 21 Drawing Figures

DRAG REDUCER FOR LAND VEHICLES

The Government has rights in this invention pursuant to Grant No. SIA 74-14843 awarded by the National Science Foundation.

BACKGROUND OF THE INVENTION

This application is a continuation-in-part of co-pending application Ser. No. 763,796, filed Feb. 1, 1977, and now abandoned which is a continuation-in-part of application Ser. No. 659,517, filed Feb. 19, 1976, now abandoned.

FIELD OF THE INVENTION

This invention relates to a device for reducing the aerodynamic drag on load carrying vehicles including a cab portion and a van portion the front wall of which extends above the cab portion such as articulated tractor-trailer combinations wherein the height of the trailer is greater than the height of the tractor.

Research has demonstrated that a substantial part of the aerodynamic drag experienced by a tractor-trailer combination moving over the highway is the result of flow separations that occur at the forward edges of the trailer. These separations result in large part from the inability of the flow that passes above the tractor roof and impinges on the front of the trailer to follow every contour of the trailer as it moves around its forward edges and onto its sides. The net effect of such separations is an increase in the average static pressure that acts on the front of the trailer with a corresponding increase in drag. It follows that significant drag reductions can be achieved with the aid of a device that will reduce flow separations in this region.

DESCRIPTION OF THE PRIOR ART

One prior art method of reducing the drag in the immediately described region lies in the design of devices which are attached to the front of the trailer and improve the manner in which the impinging flow moves around the trailer's forward corners. A disadvantage of such devices is the fact that those thus far designed have not been successful in the total elimination of flow separation, particularly of that part due to the flow which passes downward through the gap between the back of the tractor and the front of the trailer.

An alternative prior art method of reducing the drag on a tractor-trailer combination lies in the design of a device which attaches to the roof of the tractor and prevents the flow passing over the roof from impinging on the trailer. Past examples of this approach have been primarily in the form of flow deflectors designed to divert the flow about the portion of the front of the trailer which extends above the tractor cab roof. It is known, however, that the sizing of such devices for optimum drag reduction is a function of the size of the gap from the back of the tractor to the front of the trailer, that the drag reduction can decrease markedly when a device optimized for one gap is used at another, and that the performance of most such deflectors degrades very rapidly in the presence of winds that have a velocity component normal to the direction of motion.

SUMMARY OF THE INVENTION

The invention comprises a device that can be attached to the roof of a cab portion of a load carrying vehicle including a van portion, for example, the tractor of a tractor-trailer combination, for the purpose of reducing aerodynamic drag. The device is a fairing that is configured to prevent the flow that passes over the tractor roof from impinging on the front of the trailer. The fairing is designed to provide significant drag reductions in situations where the relative airstream is aligned with the direction of motion of the vehicle (0° yaw condition), and in the presence of winds that have a velocity component normal to the direction of motion (yawed condition). Another important feature of the invention is that it provides a single device which achieves optimum drag reductions on a given tractor-trailer combination for all practical gap settings between tractor and trailer.

The device consists essentially of a combination of top and side portions or walls. The top wall or portion is contoured upwardly from the front of the device, which is located at a forward position on the top surface of the tractor roof, to a rearward position whose height, ideally, is substantially equal to the height of the front face or wall of the trailer above the tractor roof. The contour of the top wall of the device in the vicinity of the position of maximum height causes the flow that passes over the top wall to be rearwardly directed across the gap between the tractor and the trailer, and to reattach smoothly onto the top of the trailer. Criteria are provided for the optimum design of the top wall or portion, together with a range of acceptable non-optimum design conditions that will produce nearly optimum drag reduction.

The side walls or portions of the device are generally vertical and extend from the top wall to the roof of the tractor. The side walls are contoured outwardly from a position near the longitudinal centerline of the tractor to a width at a rearward position which, ideally, is equal to that of the trailer, or practically, as wide as the tractor roof will allow. The rearward portions of the side walls are configured to encourage the flow that passes along them to the rearwardly directed across the gap and to reattach smoothly onto the side walls of the trailer. Examples of side wall contours that will encourage good yaw performance are cited, and a range of widths that will yield usable drag reductions is provided.

The primary object of this invention is the provision of a device that can be attached to the roof of a tractor used in combination with a trailer.

A further object of this invention is the provision of a fairing which, by reducing wind resistance, will reduce fuel consumption, and will improve vehicle stability for purposes of reducing driver fatigue and enhancing safe vehicle operations.

Still another object of this invention is the provision of a device that will accomplish the foregoing objectives in a manner which is different from, and superior to those of previous devices intended for a similar purpose.

DESCRIPTION OF THE PREFERRED EMBODIMENTS

In the discussion that follows, it will be useful to keep in mind the manner in which aerodynamic drag on a tractor-trailer combination is reduced with the aid of a device attached to the tractor roof.

When a device is attached to the roof of a tractor, the aerodynamic drag on the tractor is increased. However, because the front of the trailer rides in the low-speed wake produced by the device, the drag on the trailer is reduced. The net decrease in the drag of the combination, therefore, is equal to the decrease in the drag on the trailer minus the increase in the drag on the tractor. The net drag reduction that can be achieved on a given combination will be a function of the device employed, the gap involved, and the ambient conditions.

Figure 1:
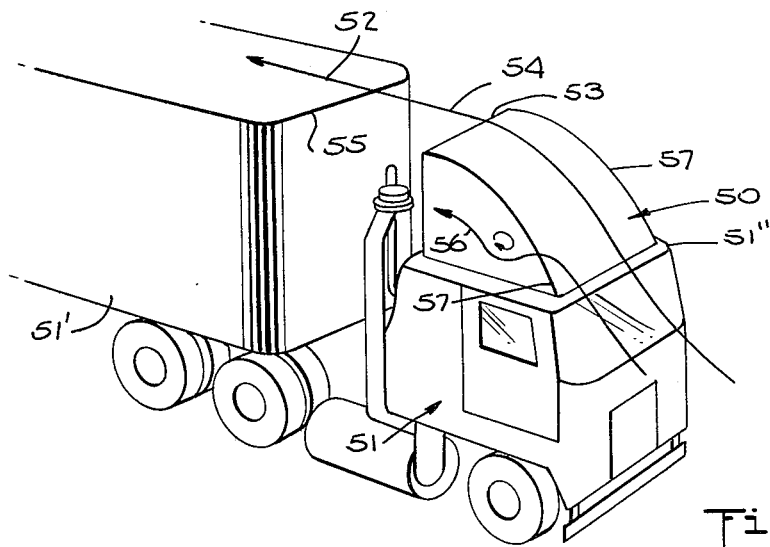
FIG. 1 is a perspective view of a portion of a tractor-trailer combination having one form of prior art drag reducing means mounted on the roof of the cab of the tractor.
Figure 2:
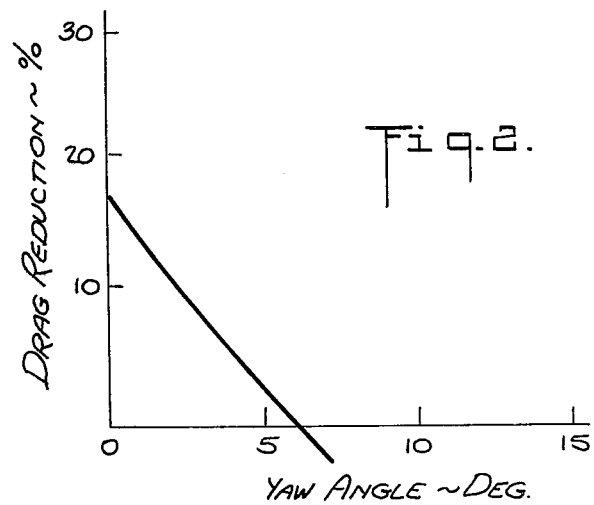
FIG. 2 is a graph showing the effectiveness of the device shown in FIG. 1.

In FIG. 1, a prior art tractor 51 and trailer 51' are shown with one type of prior art drag reducing device 50 attached to the roof 51" of the tractor. The height of the rear top edge 53 of the device above the tractor roof 51" is equal to the height of the top forward edge 55 of the trailer above the tractor roof. The drag reducer 50 is designed to encourage the flow of air that passes over the roof of the tractor to move in an upward and rearward direction, as indicated by streamline 52, so that upon passing beyond the rear top edge of the device, the flow will move across the gap 54 in a substantially downstream direction and then reattach at the top forward edge 55 of the trailer. Thus, with regard to its design and with regard to the effect it produces on the flow, device 50 can be considered as a two-dimensional drag reducer. While, for the zero yaw flow condition assumed in FIG. 1, the flow passing above the tractor is prevented from impinging on the trailer thereby substantially reducing its drag at that condition, a small part of the flow, illustrated by streamline 56, is widely diverted around the side edges 57 of device 50 giving rise to flow separations that increase the drag of the tractor 51. More importantly, these side edge separations increase in the presence of crosswinds, that is, for non-zero yaw conditions, and significantly reduce the effectiveness of device 50 at these conditions. This has been verified in experiments conducted in a low-speed wind-tunnel, results from which are presented in FIG. 2. As can be seen from FIG. 2, while the drag is substantially reduced at 0° yaw, the drag reduction rapidly decreases in the presence of crosswinds, and even becomes negative, meaning that it increases vehicle drag, at yaw angles of interest. The average effectiveness of device 50 will be discussed later.

Figure 3:
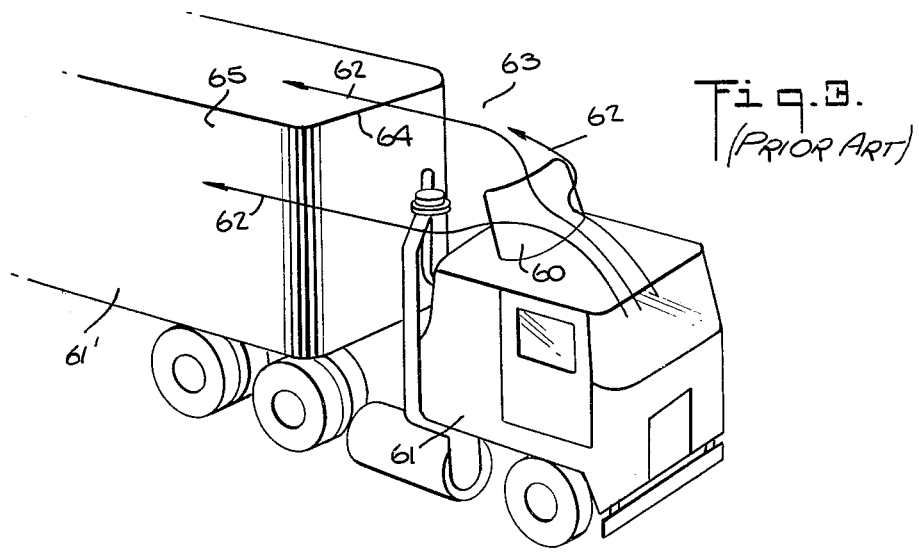
FIG. 3 is a view like FIG. 1 of another form of prior art drag reducing means.
Figure 4:
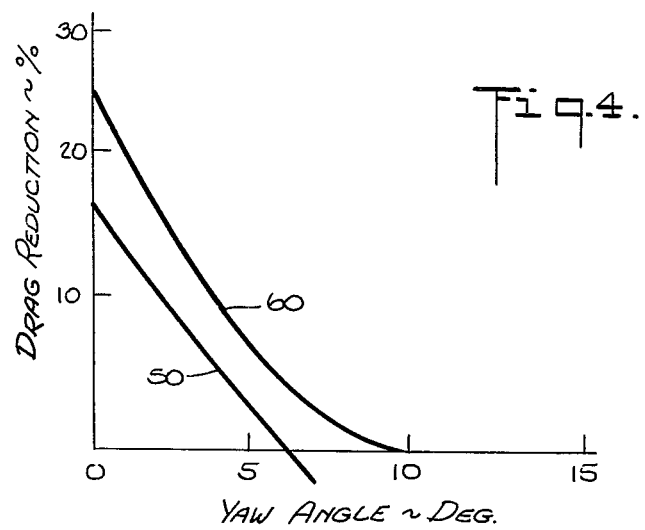
FIG. 4 is a graph like that shown in FIG. 2 showing a comparison of the effectiveness of the devices shown in FIGS. 1 and 3.

A second type of drag reducer is illustrated in FIG. 3. The drag reducing device 60, attached to the roof of tractor 61, is a deflector whose optimum height from the roof of the tractor is less than the height of the roof of trailer 61' and whose optimum width is less than the trailer width. The device 60 is designed to deflect the airflow passing above the tractor in upward and outward directions in a manner to avoid entry of the air stream 62 into the gap 63, and to cause the flow to reattach smoothly at the forward top edge 64 and sides 65 of the trailer. The optimum geometry of the deflector is a function of the vehicle configuration, and of the size of the gap between the tractor and the trailer. Consequently, if the deflector is sized for optimum performance at one gap, non-optimum performance will be realized at all other gaps. Further, the optimum drag reduction that can be achieved at one gap setting will be generally different from that which can be achieved at another gap. Finally, the instability of the deflector's wake flow in the presence of crosswinds causes a significant reduction in the effectiveness of the device with increasing yaw angle. Wind-tunnel measurements of the performance of device 60 are compared to those of device 50 in FIG. 4 where, while device 60 proves to be generally superior to device 50, the drag reduction effectiveness of device 60 is seen to decrease to near zero at yaw angles of interest. The average effectiveness of device 60 will also be discussed later.

Figure 16:
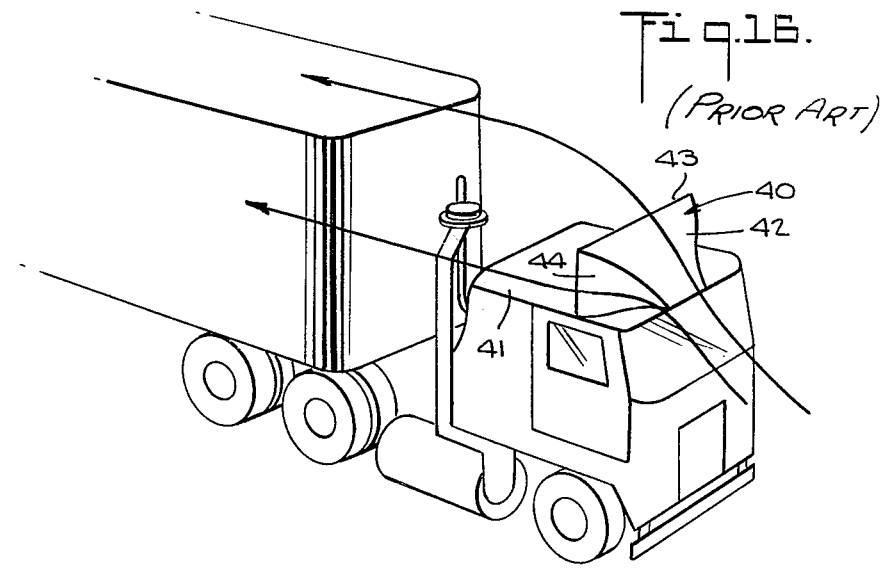
FIG. 16 is a view like FIG. 1 of another form of prior art drag reducing means.

A third type of drag reducer is illustrated in FIG. 16. The drag reducing device 40, attached to the roof of tractor 41, has an optimum height from the roof of the tractor which is less than the height of the trailer and an optimum width which is equal to the width of the trailer. The rearwardly inclined upper surface 42 of the device is designed to deflect part of the air flow passing above the tractor in an upward direction so that the flow, after passing beyond the trailing edge 43 of the device, will continue to progress upward and onto the top of the trailing van. The side surfaces 44 of the devices are designed to direct the remainder of the air flow in an initially outward direction before causing it to move downstream near the vertical trailing edges.

The flow separates from these edges and reattaches along the upper vertical corners at the front of the trailer. As in the preceding case, the separation stream surface produced downstream of the trailing edge of the inclined upper surface will, for a given deflector and vehicle configuration, be optimum at but one gap. At all other gaps the flow passing over the upper surface of the device will either be deflected too high or too low causing a decrease in drag reducing ability. The variation of average drag reduction effectiveness with gap size to be presented later will demonstrate the considerable magnitude of the decrease in performance that may occur at such non-optimum operating conditions.

To summarize the prior art, there has been an evolution of designs for tractor roof-mounted drag reducers. With each new design there has come an improvement in drag reducing ability. However, in every case cited, the designs either suffer from the inability to provide significant drag reductions in the crosswind situation or from having their design for optimum effectiveness being a function of the gap between the tractor and the trailer.

Figure 5:
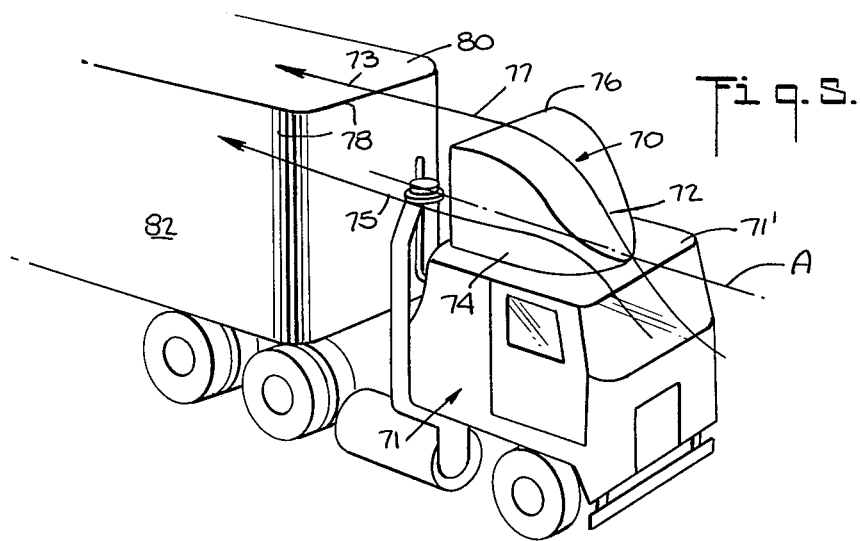
FIG. 5 is a view like FIG. 1 of one form of the present invention.

The device of the instant invention has been found to provide significant drag reduction at 0° yaw, to maintain its effectiveness with increasing yaw angle, and to have its geometry for optimum performance be independent of the size of the gap between the tractor and the trailer. One form of the invention is illustrated in FIG. 5. At zero yaw the flow of air passing above roof 71' of the tractor 71 is encouraged to divide, with a portion passing over the top portion 72 of the device as shown by streamline 73, and a portion passing around the side portions 74 of the device shown on the visible side by streamline 75. These flows are then encouraged, by the shape of the device, to change their outward directions to downstream directions which are substantially parallel to the roof and sides of the trailer before separating from the device 70 at its downstream portion 76. The flow then continues across gap 77 and smoothly reattaches itself to the trailer at its forward edges 78.

Ideally, to accomplish the latter effect in an optimum manner that is independent of the size of the gap 77, the height of the device 70 is substantially that of the vertical distance from the tractor roof 71' to the trailer roof 80, the width of the device 70 is substantially that of the trailer 82, the top wall is smoothly contoured upwardly from the front of the device to the position of maximum height at which position the tangential plane of the top wall is substantially parallel to the top of the trailer, and the side walls are smoothly contoured outwardly from the front of the device to the position of maximum width at which position the tangential planes of the side walls are substantially parallel to the sides of the trailer. In FIG. 5 the longitudinal axis A of fairing 70 is shown. The axis A coincides with the centerline of the cab of tractor 71. It can be seen that fairing 70 is symmetrical about a vertical plane passing through axis A.

General rules for the development of the top and side wall contours of the device to effect the described performance will be given later. Before doing this, however, it is of interest to compare the performance of the instant invention with that of the prior art.

Figure 6:
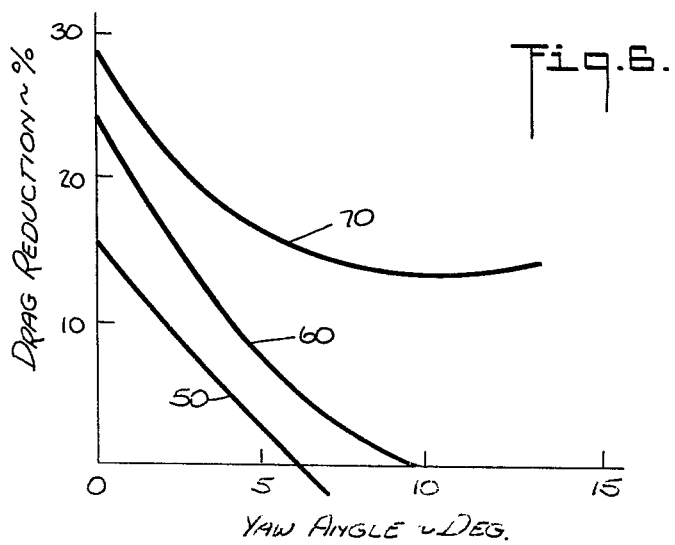
FIG. 6 is a graph like that shown in FIG. 2 showing a comparison of the effectiveness of the devices shown in FIGS. 1, 3 and 5.

A comparison of wind-tunnel measurements of the variations of drag reduction effectiveness of devices 50, 60, and 70 with yaw angle is illustrated in FIG. 6. As can be seen, device 70 provides superior performance not only at 0° yaw, but, more importantly, at non-zero yaw angles. Since a vehicle encounters a whole spectrum of wind speeds and wind directions during highway operations, it is of interest to estimate the average drag reduction that might be provided by a given device. This can be done by taking appropriate values for the average wind speed and vehicle operating speed, assuming that the wind is equally likely to approach the vehicle from any direction, computing the relative airspeed and yaw angle for a number of wind direction angles equally spaced around the compass, and then using this information together with the drag coefficient versus yaw angle data to compute the average drag. This number would be indicative of the average drag that a vehicle could experience during long term operations over the nation's highways. The results of computations for a number of vehicle configurations, before and after modification by the addition of drag reduction devices, demonstrate that while the average drag is a function of the vehicle design and the design of the drag reduction device, the average percentage reduction in drag can be usually found in an approximate yaw angle range of from 5° to 8°.

With reference once again to FIG. 6, it can be seen that the average drag reduction of the device of the instant invention, estimated from the data at yaw angles in the 5° to 8° range, is significantly better than that of designs 50 and 60 of the prior art demonstrating the benefit of its unique design. Similar results have been obtained in full-scale coast-down tests and in fuel economy runs.

Figure 17:
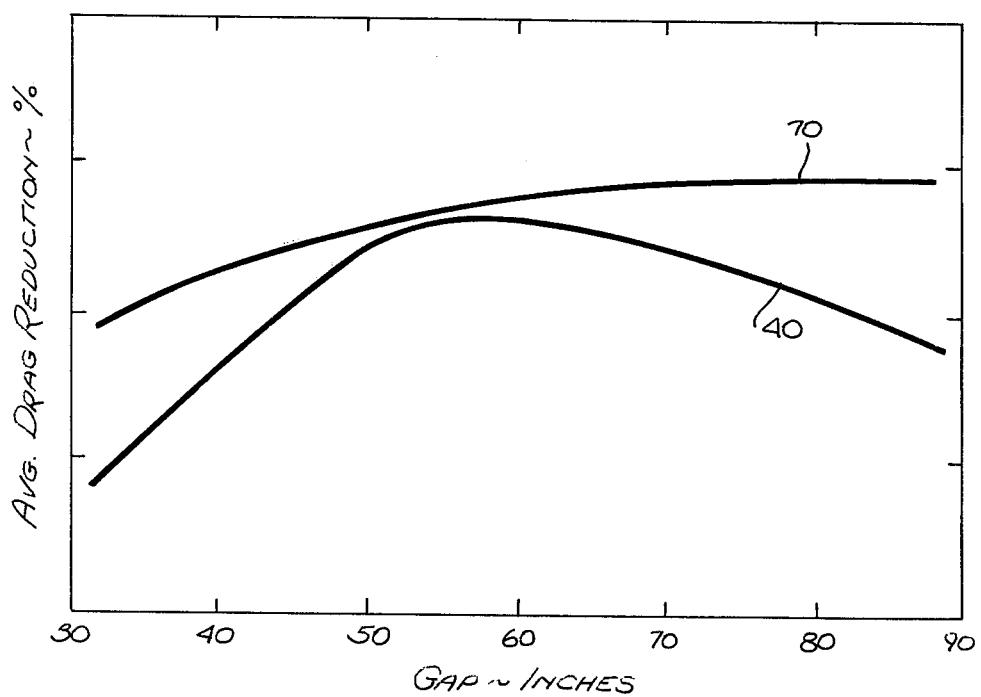
FIG. 17 is a graph showing a comparison of the effectiveness of the devices shown in FIGS. 5 and 16.

FIG. 17 presents a comparison of the variation of average drag reduction with gap size for device 70 of the instant invention with device 40 of the prior art. As can be seen, device 40 provides maximum drag reductions at a gap width of slightly greater than 50 inches. At gap distances less than this value, the device is not operating optimally in the respect that the flow is not sufficiently deflected to prevent its impingement on the front of the trailer. As a consequence, the effectiveness of the drag reducer decreases very rapidly with decreasing gap size. At gap distances greater than the optimum value, the flow is deflected too high so that flow reattachment occurs downstream of the trailer's leading edges. Again, the effectiveness decreases but this time as gap size increases.

In comparison, the effectiveness of device 70 increases with increasing gap size owing to the greater drag producing role played by the trailer face with increasing gap, and, hence, greater potential for drag reduction as gap size increases. Note that the performance of device 70 is significantly better than device 40 except near the gap size about which device 40 is optimized. Since it is not unusual for the gap size on a given vehicle to be varied quite frequently, it is apparent that the average drag reductions that would be provided by the device of the instant invention are significantly higher than those that would be provided by the device of the prior art.

As has been mentioned, device 70 as shown in FIG. 5 is a preferred embodiment of the present invention. It has been found that, while ideal performance is achieved with the streamlined fairings of the present invention that extend the full-length of the tractor roof, useful drag reductions can be achieved with shorter designs, as illustrated by shapes 85 and 86 in FIG. 7. The primary difference between the longer and the shorter fairings is that the longer fairing allows for the design of side wall contours that would provide better yaw performance than might be realized with a shorter design.

Data have been obtained which indicate that acceptable performance can be achieved for fairings with lengths l as long as 0.2W, where W is the width of the trailer.

Ideally, the height of the streamlined fairing should be such that its height, h, be substantially equal to the vertical distance from the top of the tractor cab roof to the top of the trailer, H, that its width, w, be substantially equal to that of the trailer, W, and that planes tangential to the top and side walls at their positions of maximum height and width be substantially parallel to the top and side walls of the trailer, respectively.

Figure 8:
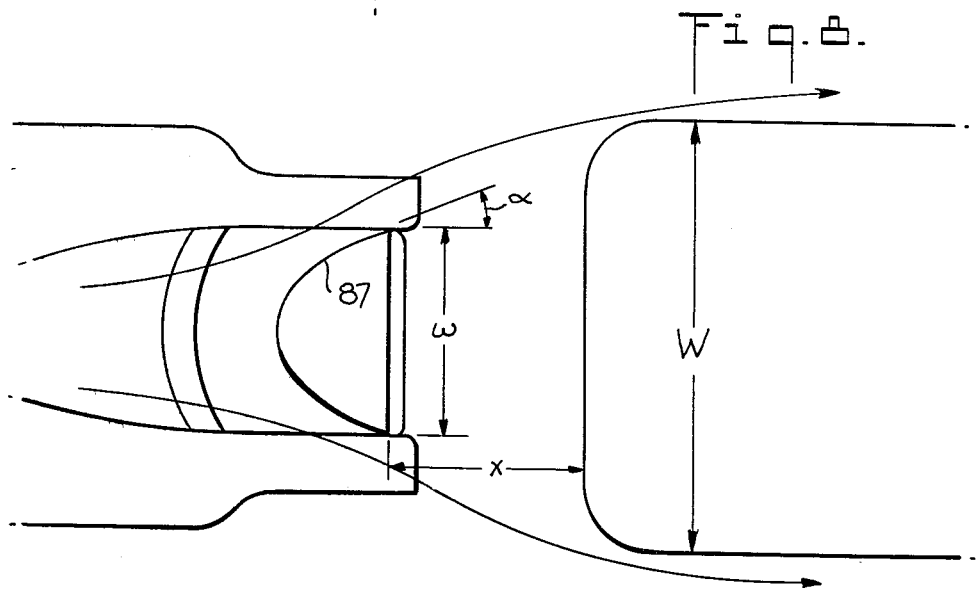
FIG. 8 is a diagram illustrating the relationship between the width of the drag reducing device and the width of the tractor roof and the van.

It is recognized that the width, w, may be limited by the width of the roof of the tractor to which it is attached, which is the usual case. This is particularly true in situations where the tractor is of conventional design as is illustrated in FIG. 8. However, by designing the streamlined fairing 87 such that a shallow angle, $\alpha$, is formed between the tangential plane of its sides at their back edges and the centerline of the truck, useful drag reductions can be achieved at a width as low as 0.5W. A consideration of the behavior of separated flows suggests that an angle $\alpha = \tan^{-1}[(W-w)/x]$, where x is the distance from the back of the device to the front of the trailer, would provide near optimum drag reductions at zero yaw angle. However, excellent drag reductions have been achieved in wind-tunnel tests with $\alpha$ nearly one-fourth the value suggested by the equation above.

Figure 9:
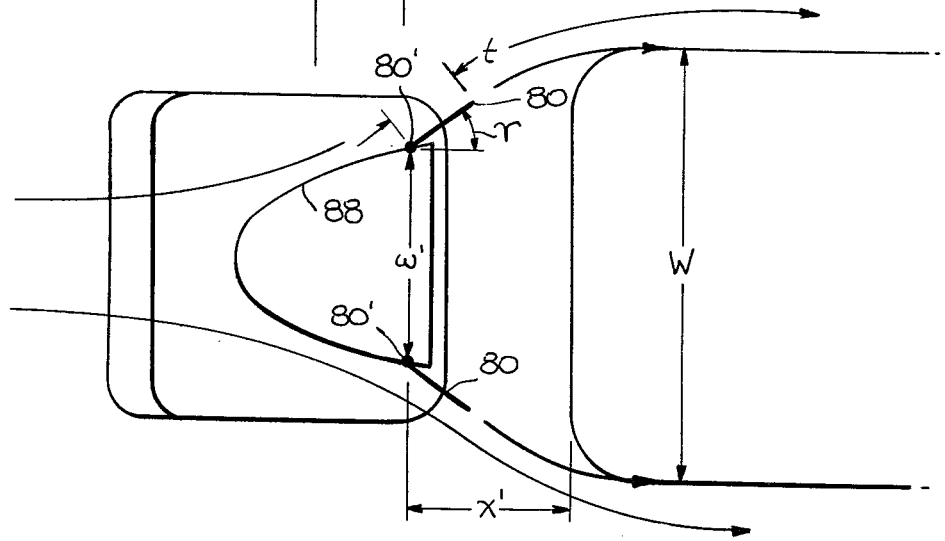
FIG. 9 is a diagrammatic showing of means for extending the effective width of the drag reducing device.

A means for optimizing the performance of a fairing over a range of distances x when w < W is illustrated in FIG. 9. Here, side trim tabs or variable release angle tabs 80 are hinged near the back vertical edges of fairing 88 and oriented at an angle $\gamma$ to the vertical plane of symmetry of the tractor. The optimum value of $\gamma$ is that at which the flow that separates from the trailing edges of the trim tabs smoothly reattaches to the sides of the trailer along its front vertical edges.

For a fairing of given design, the optimum value of $\gamma$ is a function of the length of the trim tab t, the location of its hinge line 80' relative to the back vertical edge of the fairing, the width differential (W−w), and the distance x from the back of the fairing to the front of the trailer. Optimum values of $\gamma$ will lie in the range $\gamma > \tan^{-1}[(W-w')/2x']$, where x' is the horizontal distance from the hinge line to the front of the trailer and w' is the width between the two hinge lines 80'.

If for given values of (W−w), x, and the location of the hinge line relative to the back vertical edge of the fairing, an optimum value of $\gamma$ cannot be found, the length of the side trim tab must be increased and/or the location of its hinge line shifted toward the back vertical edge of the fairing. It will usually be found that a trim tab length t in the range $t < (W-w')/(2 \sin \gamma)$ results in the realization of an optimum value of $\gamma$. In most cases the highest average drag reductions will be obtained with the longest and most rearwardly located trim tabs that can be practically accommodated.

Since the side trim tabs, in effect, represent outward extensions of the sides of the fairing, the best performance will be obtained with trim tabs whose vertical height h' is equal to the height h of the fairing. However, realizing that a particular design might require h' to be less than h, it is to be noted that the side trim tabs can provide useful drag reduction benefits at values of h' which are as low as 0.5 h.

In addition, the width w of the fairing may be wider than the width W of the trailer. However, in most situations the maximum width of the fairing is limited by legal restrictions to the width W of the trailer.

Figure 11:
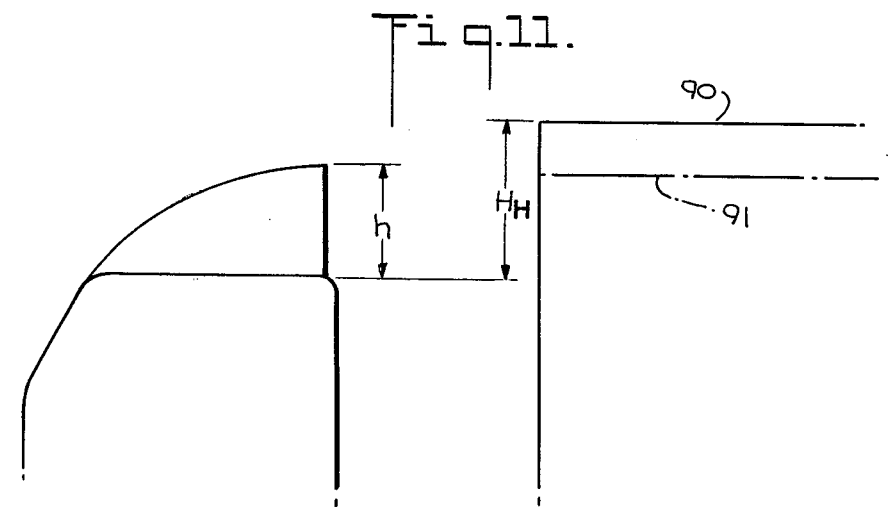
FIG. 11 diagrammatically illustrates an instance where the height of the drag reducing device plus the height of the tractor roof are not equal to the height of the trailer.

It is further recognized that the height h of the streamlined fairing may not always be equal to the vertical distance from the roof of the cab portion of the vehicle to the top of the front wall of the trailing body. One instance where this can occur is illustrated in FIG. 11. In this figure a tractor equipped with a fairing optimized for one trailer height indicated by top 91 is shown used in combination with a higher trailer as indicated by roof 90. Data have been obtained which demonstrate that, in spite of the fact that some flow will impinge on the trailer, the device can retain greater than 93% of its effectiveness for $h \geq 0.9 H_H$ and greater than 75% of its effectiveness for $h \geq 0.8 H_H$, where $H_H$ is the vertical distance from the top of the tractor cab roof to the top of the higher trailer.

Figure 12:
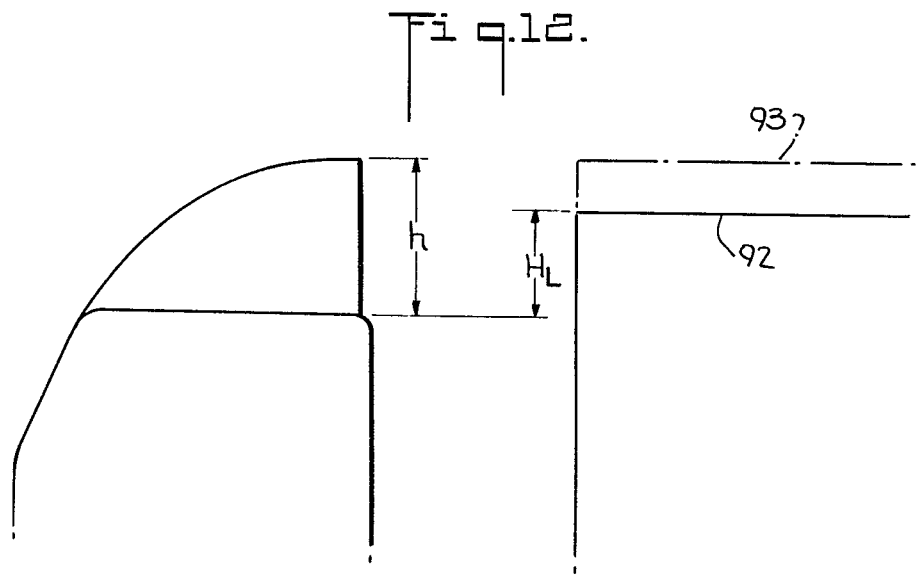
FIG. 12 illustrates a situation where the upper edge of the drag reducing device is higher than the top of the trailer.

Another instance where a height mismatch can occur is illustrated in FIG. 12. Here a tractor equipped with a fairing optimized for one trailer height indicated by roof 93 is shown used in combination with a lower trailer indicated by top 92. Again, research results have been obtained which indicate that the device can retain greater than 93% of its effectiveness for $h \leq 1.2 H_L$ and greater than 81% of its effectiveness for $h \leq 1.4 H_L$, where $H_L$ is the vertical distance from the top of the tractor cab roof to the top of the lower trailer.

In situations where a fairing is to be designed that will be used with trailers of various heights, a compromise design solution can be sought. It is apparent that the loss in performance for a given height mismatch is greater when the fairing is of lesser height than the trailer than when it is of greater height. This suggests that the fairing be designed with a height that is closer to that of the higher trailer than the lower one. A consideration of the results presented above indicates that a practically useful fairing be designed for a trailer whose height would be about equal to the height of the front wall of the lowest trailer above the cab roof plus about 60% of the difference in height between the highest and lowest trailer. For example, if the device is to be used with trailers that range in height from 12'6" to 13'6" above the ground, the fairing should be designed for a trailer height of about 13'1". A consideration of contemporary tractor heights suggests that the maximum value of $h/H_L$, corresponding to use with the 12'6" trailer, is equal to about 1.2, and the minimum value of $h/H_H$, corresponding to use with the 13'6" trailer is equal to about 0.9. In light of the preceding data, it is apparent that the practical design solution provides optimum or near optimum performance for all trailer heights within the range considered in the solution.

Another possible practical design solution for the situation of use with trailers of various heights requires that the fairing be designed to have the smallest height possible. This would arise in situations where legal restrictions might limit the height of the fairing to that of the lowest trailer. In this situation, to regain the loss in performance with h < H, it would be advantageous to depart from the ideal design condition that requires the plane tangent to the top wall of the fairing at its maximum height position to be parallel to the top of the trailer. Thus, the fairing is provided with a slight inclination on the top wall near its trailing edge. In this instance a consideration of the behavior of the flow separation from such a ssurface suggests that the angle of this inclination be less than or equal to about $\tan^{-1}[2(H-h)/x]$. However, the provision of such an angle for h much less than about 0.9 H would not be recommended because then the fairing may begin to exhibit some of the deleterious gap dependent performance characteristics of deflector type devices. A variation of this design solution would be to design the fairing so that the plane tangent to its top wall at its maximum height position is equal in height and parallel to the top of the lowest trailer that would be attached to the tractor, and to incorporate into the design some mechanism to upwardly reposition the fairing or at least its top wall in a manner to provide the necessary inclination angle at the trailing edge of the top wall of the fairing when it is used with a higher trailer. An advantage of this design variation is that the height of the fairing in its lowest position can be less than 0.9 times the height of the highest trailer.

Figure 10:
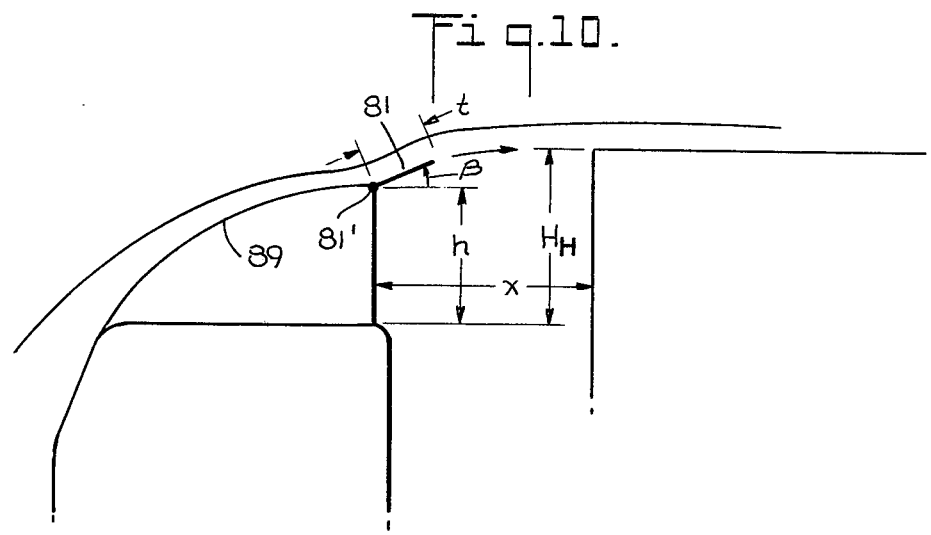
FIG. 10 diagrammatically illustrates a means for extending the effective height of the drag reducing device.
Figure 18:
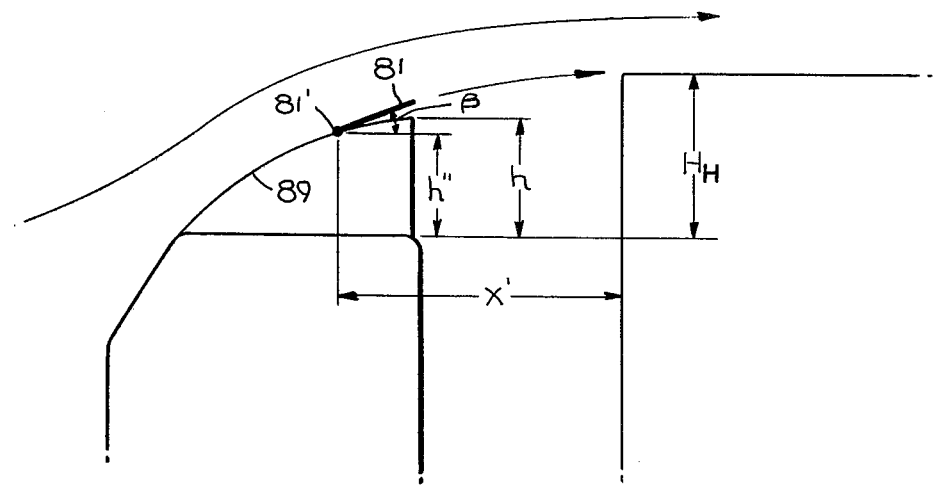
FIGS. 18, 19, 20 and 21 illustrate further embodiments of the drag reducing device of the invention including means for extending the effective height of the device.
Figure 19:
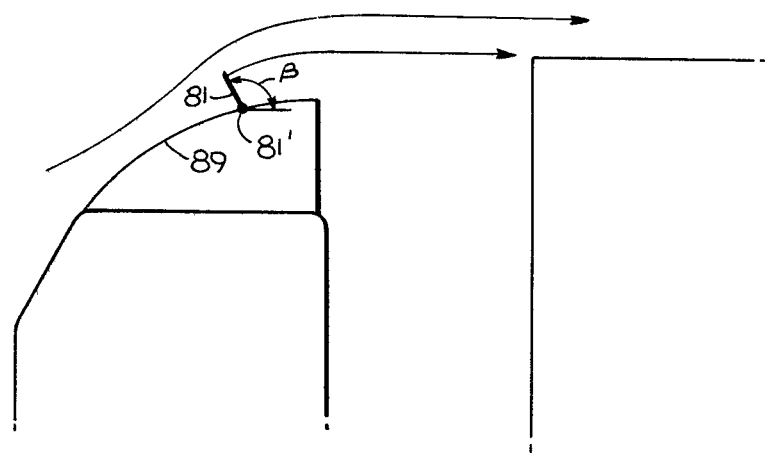

A means for optimizing the performance of a fairing over a range of distances x when $h < H_H$ is illustrated in FIG. 10. Here, top trim tab 81 is hinged along the back horizontal edge of fairing 89 and inclined at an angle $\beta$ to the horizontal plane. The optimum value of $\beta$ is that at which the flow that separates from the trailing edge of the trim tab smoothly reattaches to the top of the trailer along its top front horizontal edge. FIGS. 18 and 19 illustrate two other trim tab arrangements with the tabs set at their optimum values of $\beta$ corresponding to their respective lengths and hinge line locations.

For a fairing of given design, the optimum value of $\beta$ is a function of the length of the trim tab t, the location of its hinge line 81′ relative to the back horizontal edge of the fairing, the height differential $(H_H - h)$, and the distance x from the back of the fairing to the front of the trailer. Optimum values of $\beta$ will lie in the range $\beta > \tan^{-1} [(H_H - h'')/x']$, where x′ is the horizontal distance from the hinge line of the tab to the front of the trailer and h″ is the height of the hinge line above the tractor roof (see FIG. 18).

If for given values of the height differential $(H_H - h)$, the distance x from the back of the fairing to the front of the trailer, and the location of the tab hinge line relative to the back horizontal edge of the fairing, an optimum value of $\beta$ cannot be found, the length of the top trim tab must be increased and/or the location of its hinge line shifted toward the back horizontal edge of the fairing. It will usually be found that a trim tab length t in the range $t < (H_H - h'')/\sin \beta$ will result in the realization of an optimum value of $\beta$. In most cases, the highest average drag reductions will be obtained with the longest and most rearwardly located trim tabs that can be practically accommodated.

Since the top trim tab, in effect, represents an upward extension of the top wall of the fairing, the best performance will be obtained with trim tabs whose width w″ is equal to the width w of the fairing. However, realizing that a mechanical design might require w″ to be less than w, it is to be noted that the addition of a top trim tab can provide useful benefits at values of w″ as low as 0.5w.

One final consideration in the design of a top trim tab equipped fairing concerns the choice of fairing height. Since the trim tab can be set to provide optimum flow control at each distance x, the value of h as a fraction of H can be lower than the 0.9 value which was established earlier as the minimum for a fixed geometry fairing whose top wall is slightly inclined near its trailing edge. However, noting that, for given values of x, t, and the hinge line location, the optimum value of the angle $\beta$ will generally increase as the height differential $(H_H - h)$ increases, fairings which incorporate top trim tabs should not be designed with $h < 0.5 H_H$ in order to preserve the favorable drag reduction and yaw characteristic that is achieved by the fairing design.

In one example of a top trim tab application, a fairing having a 39-inch length, a 75-inch width and a 39-inch height was operated with $H_H = 49$ inches and $x = 46$ inches. A trim tab having a length of 14 inches was installed as in FIG. 18. The trim tab was adjusted in accordance with the guidelines set forth in the preceding paragraph and the resultant optimum value of $\beta$ was found to be about 23°.

Figure 20:
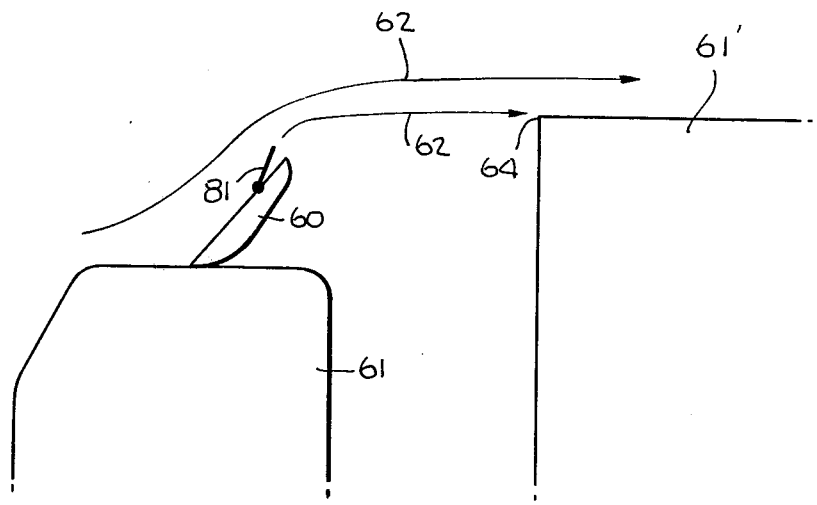
Figure 21:
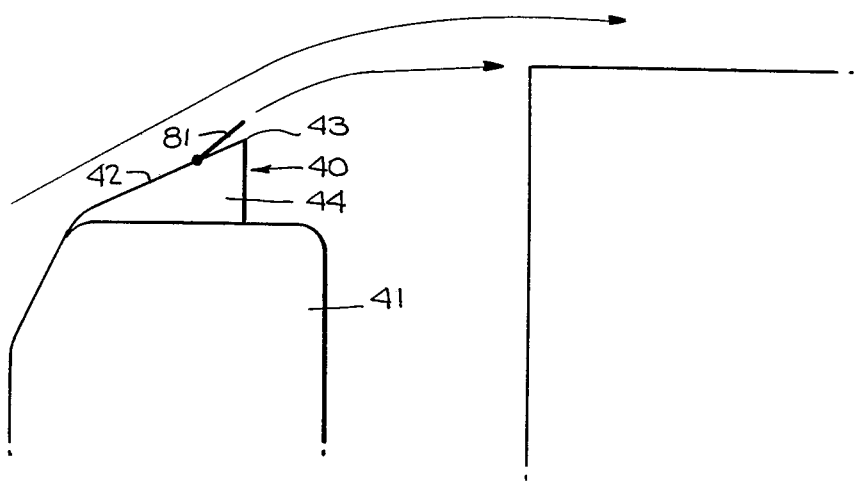

It has been shown that, in the off-design situation when $H < H_H$, the use of a trim tab on a fairing makes possible the recovery of near on-design flow control for various independent values of $(H_H - h)$ and the distance x from the back of the fairing to the front of the trailer. The addition of a trim tab to deflector-type drag reducers can also improve their performance at off-design conditions. The guidelines for establishing the proper trim tab angle in the latter instance would be the same as those previously set forth for the fairing. Examples of such applications are illustrated in FIG. 20 for a deflector of the type illustrated in FIG. 3, and in FIG. 21 for a deflector of the type illustrated in FIG. 16.

To this point, the discussion has been concerned with ideal and permissible non-ideal specifications of the height, width, and length of the fairing of the instant invention together with similar specifications for the inclinations of its top and side walls at their positions of maximum height and width with respect to the top and side walls of the trailer, respectively. The discussion will now be concerned with guidelines that can be used to develop the contours that fit within the prescribed dimensions and satisfy the specified tangency conditions.

Figure 15:
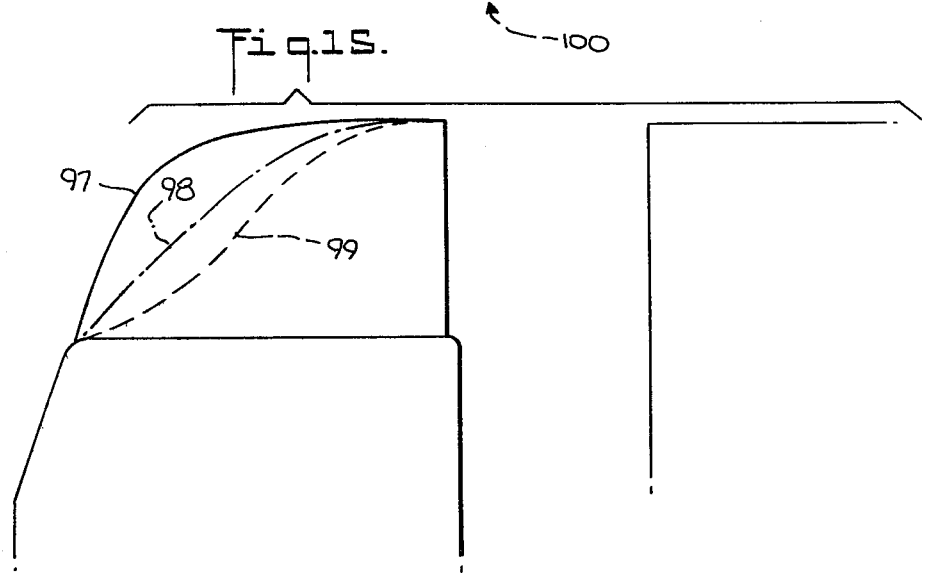
FIG. 15 is a diagrammatic elevational view showing various contours which the drag reducing means of the invention can assume.

Shown in FIG. 15 are several examples of the profile view that the top wall of a streamlined fairing 97, 98 and 99 can assume and still function in a manner of performance consistent with the objectives of the invention. As can be seen, convex or concave-convex contours can be used. The surface need not be continuously curved, as shown, but can include straight portions as well. In all cases, at the position of maximum height, the tangent to the surface should be parallel to the trailer roof or should be inclined relative to the trailer roof at the appropriate angle to optimize performance when $h < H$. It is desirable, though not mandatory, that the surface be free of any areas where the slope is discontinuous, the reason being that such areas could cause flow separations to occur that might affect the angle that the flow separates from the top wall of the fairing, and could increase the drag on the fairing itself. For this same reason, gradual changes of direction with distance along the top wall are preferred over more rapid ones. Finally, it is desirable that the radius of curvature at the point of tangency be generous. For example, for fairings where $l > h$, the radius of curvature could be gradually increased with distance from the front of the fairing, or simpler yet, a circular arc could be described between the front and the position of maximum height with the center of the arc selected to satisfy the maximum height tangency condition. Or, for fairings where $l < h$, the radius of curvature could be generally decreased to a value that preferably would not be less than about 0.1W.

Figure 13:
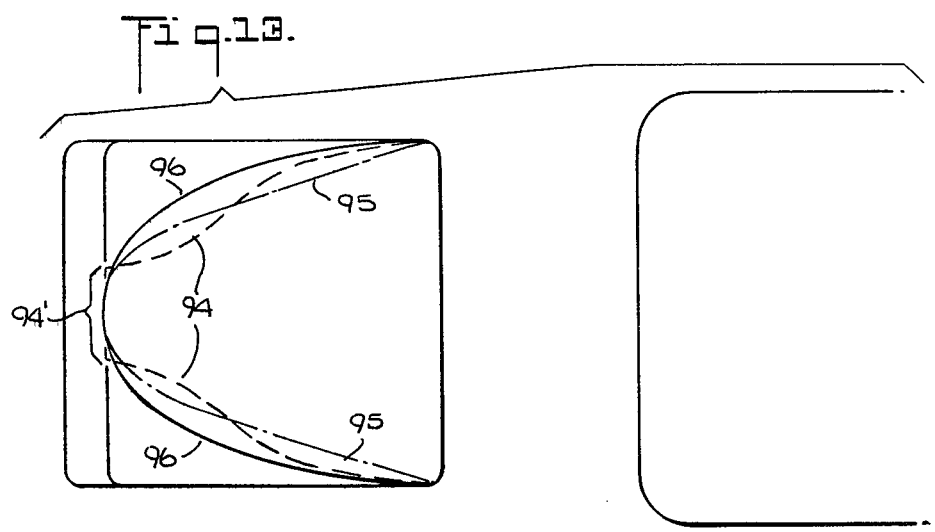
FIG. 13 illustrates variations in the side wall configuration of drag reducers of the form of the instant invention.
Figure 14:
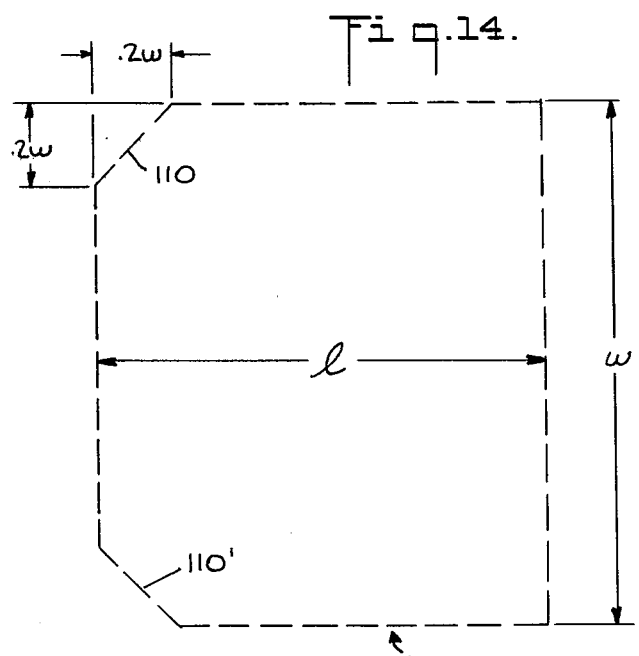
FIG. 14 is an envelope within which the plan view contour of the front and sides of the drag reducing means is to be wholly contained.

FIG. 13 illustrates several configurations that the plan view of the sides 94, 95, and 96 can assume. As before, convex, concave-convex, or a combination of these and straight portions can be used. The guidelines used in the development of these contours within the length, width, and tangency requirements for the side walls are the same as those suggested for the top wall. Since the side wall contours play an important role in achieving good yaw performance, it is desirable that the width of any flat portion 94' at the front of the fairing be small compared with the width of the rear of the fairing. A consideration of plan view shapes that should be capable of providing adequate yaw performance suggests that it is desirable to have the plan view contour of the front and sides of the fairing lie wholly within a rectangular envelope 100, FIG. 14, of length l and of width w that is intersected by a line 110 having one end point located 0.2w aft of one of the forward corners of the rectangle and the other end point located 0.2w inboard from the same forward corner, and another line 110' similarly located from the opposite forward corner. This envelope is sketched as dashed line 100 in FIG. 14.

The drawings herein of the instant invention have shown its top and sides to intersect along a sharp corner. Experiments have shown that rounding the corner provides improvements in performance when compared to the sharp corner case.

Figure 7:
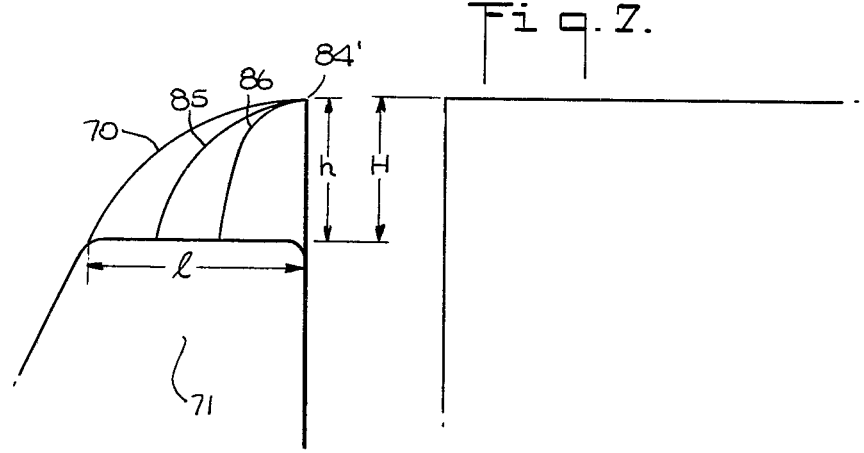
FIG. 7 is a diagrammatic showing of various lengths of the drag reducing device of the invention which come within the scope of the invention.

The drawings have also shown the profile view of the rear of the fairing to be generally vertical; for example, as in FIG. 7. Experiments have demonstrated that useful performance increases can be achieved, particularly with fairings of shorter length, by tilting the plane of the rear of the fairing such that the rearward extremity 84' of the top wall in FIG. 7 is displaced in the aft direction.

The drawings have generally shown the rear of the fairing in the same vertical plane as the back of the tractor. However, other mounting positions on the roof of the tractor may be used. A rearward displacement of the fairing from the positions shown in the drawings may be limited by the requirement that the device not interfere with the articulation of the vehicle. A forward displacement of the fairing from that position may be limited by a legal length requirement that would mean that the fairing could not extend further forward than the front of the tractor.

Finally, the discussion and drawings suggest that the plan view contour of the sides of the fairing be symmetrical about the longitudinal axis of the fairing. While this is preferred in order to provide similar drag reductions at equal positive and negative angles of yaw, it is to be understood that significant aerodynamic drag reductions could also be achieved with use of asymmetric contours developed in accordance with the guidelines set forth earlier.

From the foregoing, it is seen that there is herein provided an improved device for reducing the aerodynamic drag on tractor-trailer truck combinations and load carrying vehicles which have a cab and a van portion or trailing body rearwardly of the cab, regardless of whether the cab and trailing body are articulated or rigidly connected as in a straight chassis vehicle. Though the discussion above was specifically concerned with the use of the present invention on articulated vehicles, it is to be understood that the device is useful for reducing the aerodynamic drag on single-chassis truck/van combinations. It is to be further understood that the device may be used in any situation where the height of the front wall of the trailing body is higher than that of the cab.

What is claimed is:

1. A streamlined fairing adapted to be mounted on a roof of a cab portion of a load carrying vehicle for reducing aerodynamic drag, said vehicle including a van portion having front and side walls, said front wall of said van portion extending above said cab portion, said fairing having a longitudinal axis and comprising, a bottom portion, a rear portion, and a continuous contoured surface extending widthwise and upwards from said bottom portion at the front of said fairing to said rear portion, said surface having a top portion and side portions on either side of the longitudinal axis of said fairing which abut at their respective boundaries, said top portion having at least a substantially horizontal segment a tangential plane of which is inclined with respect to the horizontal at an angle which is [at least zero] less than or equal to approximately $\tan^{-1}[2(H-h)/x]$ and greater than or equal to zero, where H represents the vertical distance from the roof of the cab portion to the top of the front wall of a van portion for which the drag reduction performance of said fairing is optimized, h represents the height of said fairing, x represents the distance between the rear portion of said fairing and the front of said van portion, and h has a value which is greater than or equal to about 0.9 H and less than or equal to about H, and greater than or equal to about $0.8H_H$ and less than or equal to about $1.4H_L$, where $H_H$ and $H_L$ represent the vertical distances from the roof of said cab portion to the tops of the front walls of van portions which are higher and lower, respectively, than the top of said front wall of said van portion for which performance of said fairing is optimized, said side portions diverging with respect to each other toward said rear portion and having substantially vertical segments which diverge with respect to the longitudinal axis of said fairing at an angle which is less than or equal to approximately $\tan^{-1}[(W-w)/x]$ and greater than or equal to zero, where W represents the width of said van portion, w represents the width of said fairing between said substantially vertical segments of said side portions, and x represents the distance between the rear portion of said fairing and the front of said van portion, and w has a value which is greater than or equal to 0.5W and less than or equal to W, and said substantially horizontal segment of said top portion being located uppermost with respect to said bottom portion and said substantially vertical segments of said side portions being located furthest from said longitudinal axis of said fairing, the length of said fairing being less than or equal to the length of said roof of said cab portion and greater than or equal to 0.2W.

2. The fairing recited in claim 1, wherein the height of said fairing from said bottom portion to said substantially horizontal segment of said top portion is approximately equal to the vertical distance from the roof of said cab portion to the top of said front wall of said van portion; wherein the width of said fairing between said substantially vertical segments of said side portions is approximately equal to the width of said van portion; wherein the axial length of said fairing is approximately equal to the length of said roof of said cab portion; and wherein said substantially horizontal segment of said top portion is disposed parallel to the horizontal and said substantially vertical segments of said side portions are disposed parallel to said longitudinal axis of said fairing.

3. The fairing recited in claim 1, wherein said fairing further comprises a horizontal variable release angle tab hinged to said continuous surface of said fairing and adapted to be inclined at an angle with respect to the horizontal which is greater than $\tan^{-1} [(H_H - h'')/x']$, where $H_H$ represents the vertical distance from the roof of said cab portion to the top of the front wall of a van portion which is higher than the top of said front wall of said van portion for which performance of said fairing is optimized, $h''$ represents the height of the hinge line of said tab above said roof of said cab portion, and $x'$ represents the horizontal distance between the hinge line of said tab and said front wall of said van portion, and wherein the height h of said fairing is greater than or equal to $0.5H_H$.

4. The fairing recited in claim 3, wherein said tab is hinged to said continuous surface near a rear horizontal edge of said fairing.

5. The fairing recited in claim 3, wherein said variable release angle tab has a length from the leading edge of said tab to the trailing edge of said tab which is less than $(H_H - h'')/\sin \beta$, where $H_H$ represents the vertical distance from the roof of said cab portion to the top of the front wall of a van portion which is higher than the top of said front wall of said van portion for which performance of said fairing is optimized, $h''$ represents the height of the hinge line of said tab above said roof of said cab portion, and $\beta$ represents the angle at which said tab is inclined with respect to the horizontal.

6. The fairing recited in claim 5, wherein the width of said variable release angle tab between the side edges thereof is greater than or equal to 0.5w, where w represents the width of said fairing.

7. The fairing recited in claim 1, wherein said fairing further comprises vertical variable release angle tabs hinged to said side portions of said fairing.

8. The fairing recited in claim 7, wherein said tabs are hinged to said side portions near rear vertical edges of said fairing.

9. The fairing recited in claim 8, wherein said variable release angle tabs are adapted for orientation at an angle with respect to a vertical plane of symmetry of said cab portion of said vehicle which is greater than $\tan^{-1} [(W - w')/2x']$, where W represents the width of said van portion, $w'$ represents the distance between the hinge lines of said tabs, and $x'$ represents the horizontal distance between the hinge lines of said tabs and said front wall of said van portion.

10. The fairing recited in claim 9, wherein the length of said variable release angle tabs from the leading edges of said tabs to the trailing edges of said tabs is less than $(W - W')/(2 \sin \gamma)$, where W represents the width of said van portion, $w'$ represents the distance between the hinge lines of said tabs, and $\gamma$ represents the angle at which said tabs are oriented with respect to said vertical plane of said cab portion of said vehicle.

11. The fairing recited in claim 10, wherein the vertical height of said variable release angle tabs is greater than or equal to 0.5h, where h represents the height of said fairing.

12. The fairing recited in claim 1, wherein said top portion of said fairing comprises a continuous, convex contoured surface.

13. The fairing recited in claim 1, wherein said top portion of said fairing comprises a continuous, concave-convex contoured surface.

14. The fairing recited in claim 1, wherein said side portions of said fairing comprise continuous, convex contoured surfaces.

15. The fairing recited in claim 1, wherein said side portions of said fairing comprise continuous, concave-convex contoured surfaces.

* * * * *

UNITED STATES PATENT AND TRADEMARK OFFICE
CERTIFICATE OF CORRECTION

PATENT NO. : 4,245,862

DATED : January 20, 1981

INVENTOR(S) : Frank T. Buckley, Jr.

It is certified that error appears in the above—identified patent and that said Letters Patent is hereby corrected as shown below:

The title page should appear as shown on the attached sheet.

United States Patent [19]

Buckley, Jr.

[11] 4,245,862

[45] Jan. 20, 1981

[54] DRAG REDUCER FOR LAND VEHICLES

[76] Inventor: Frank T. Buckley, Jr., 17841 Pond Rd., Ashton, Md. 20702

[21] Appl. No.: 891,061

[22] Filed: Mar. 30, 1978

Related U.S. Application Data

[63] Continuation-in-part of Ser. No. 763,796, Feb. 1, 1977, abandoned, which is a continuation-in-part of Ser. No. 659,517, Feb. 19, 1976, abandoned.

[51] Int. Cl.³ .................................................. B62D 35/00
[52] U.S. Cl. ...................................................... 296/1 S
[58] Field of Search ................................. 296/1 S, 91

[56] References Cited

U.S. PATENT DOCUMENTS

| Re. 28,652 | 12/1975 | Beldfell | 296/1 S |
|---|---|---|---|
| D. 249,783 | 10/1978 | Harpel | D12/16 |
| 2,863,695 | 12/1958 | Stamm | 296/1 S |
| 2,914,231 | 11/1959 | Hornke | 296/1 S |
| 3,309,131 | 3/1967 | Saunders | 296/1 S |
| 3,348,873 | 10/1967 | Saunders | 296/1 S |
| 3,514,023 | 5/1970 | Russell | 296/1 S |
| 3,596,974 | 8/1971 | Adams | 296/1 S |
| 3,695,673 | 10/1972 | Meadows | 296/1 S |
| 3,711,146 | 1/1973 | Madzsar | 296/1 S |
| 3,768,854 | 10/1973 | Johnson | 296/1 S |
| 3,794,372 | 2/1974 | Webb | 296/1 S |
| 3,819,222 | 6/1974 | Woodard | 296/1 S |
| 3,834,752 | 9/1974 | Cook | 296/1 S |
| 3,854,769 | 12/1974 | Saunders | 296/1 S |
| 3,904,236 | 9/1975 | Johnson | 296/1 S |
| 3,929,369 | 12/1975 | Blair | 296/1 S |
| 3,934,923 | 1/1976 | Lissaman | 296/1 S |
| 3,945,677 | 3/1976 | Servais | 296/1 S |
| 3,951,445 | 4/1976 | Tatom | 296/1 S |
| 3,971,586 | 7/1976 | Saunders | 296/1 S |
| 3,972,556 | 8/1976 | Mason | 296/1 S |
| 3,999,796 | 12/1976 | Greene | 296/1 S |
| 4,006,931 | 2/1977 | Groves | 296/1 S |
| 4,018,472 | 4/1977 | Mason | 296/1 S |
| 4,079,984 | 3/1978 | Powell | 296/91 |

FOREIGN PATENT DOCUMENTS 2550726 5/1977 Fed. Rep. of Germany.

Primary Examiner—Robert R. Song
Attorney, Agent, or Firm—Kenyon & Kenyon

[57] ABSTRACT

A drag reducing device adapted to be mounted on the roof of the cab portion of a land vehicle including a trailing body for reducing aerodynamic drag. The device comprises a streamlined fairing including a bottom portion, a rear portion, and a continuous contoured surface extending widthwise and upwards from the bottom portion at the front of the fairing to the rear portion. The contoured surface has a top portion and side portions on either side of the longitudinal axis of the fairing which abut at their respective boundaries. The top portion has at least a substantially horizontal segment the tangential plane of which is inclined with respect to the horizontal at an angle which is at least equal to zero. The side portions diverge with respect to each other toward the rear portion and have substantially vertical segments which diverge with respect to the longitudinal axis of the fairing at an angle which is at least zero. The substantially horizontal segment of the top portion is located uppermost with respect to the bottom portion and the substantially vertical segments of the side portions are located furthest from the longitudinal axis of the fairing.

Fairings and air deflectors having horizontal and vertical variable release angle tabs hinged thereon are also disclosed.

15 Claims, 21 Drawing Figures

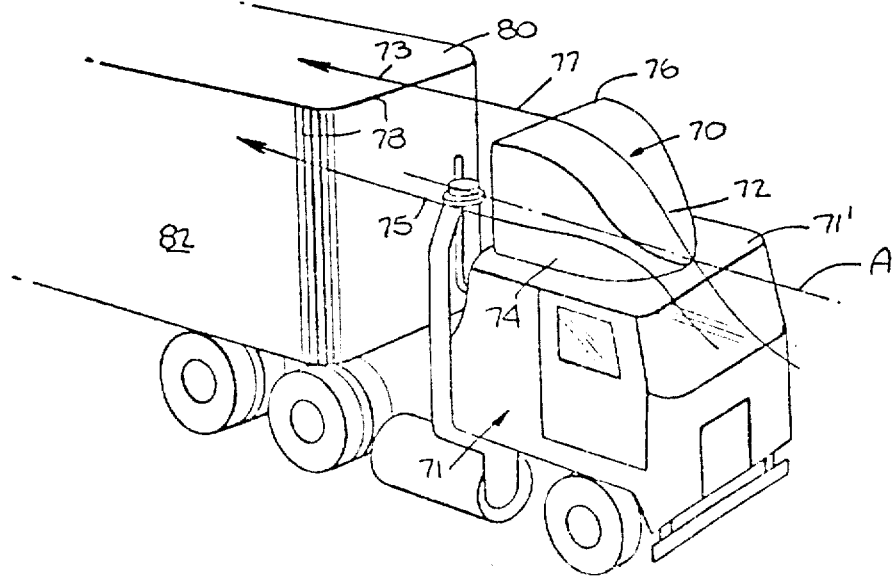

UNITED STATES PATENT AND TRADEMARK OFFICE
CERTIFICATE OF CORRECTION

PATENT NO. : 4,245,862

DATED : January 20, 1981

INVENTOR(S) : Frank T. Buckley, Jr.

It is certified that error appears in the above—identified patent and that said Letters Patent is hereby corrected as shown below:

After the title

"References Cited
U.S. PATENT DOCUMENTS"

insert the following:

| | | |
|---|---|---|
| 2,122,422 | 7/38 | Huet |
| 2,177,877 | 10/39 | Huet |
| 2,184,798 | 12/39 | Gracey |
| 2,184,995 | 12/39 | Eriksen |
| 2,206,956 | 7/40 | Hoag |
| 2,208,075 | 7/40 | Jabelmann |
| 2,220,715 | 11/40 | Heintz |
| 2,229,516 | 1/41 | Metzger |
| 2,236,846 | 4/41 | Davisson |
| 2,243,906 | 6/41 | Huet |
| 2,338,199 | 1/44 | Parke |
| 2,515,604 | 7/50 | Kish |
| 2,569,983 | 10/51 | Favre |
| 2,644,716 | 7/53 | McVicker |
| 2,778,439 | 1/57 | Pfingsten |
| 2,816,796 | 12/57 | Saucerman |
| 2,823,072 | 2/58 | Podolan |
| 2,976,077 | 3/61 | Totton, Jr. |

UNITED STATES PATENT AND TRADEMARK OFFICE
CERTIFICATE OF CORRECTION

PATENT NO. : 4,245,862            Page 4 of 5

DATED : January 20, 1981

INVENTOR(S) : Frank T. Buckley, Jr.

It is certified that error appears in the above—identified patent and that said Letters Patent is hereby corrected as shown below:

| | | |
|---|---|---|
| 3,015,517 | 1/62 | Thornburgh |
| 3,214,215 | 10/65 | Hansen |
| 3,368,841 | 2/68 | Grau |
| 3,425,740 | 2/69 | DeVaughn |
| 3,695,674 | 10/72 | Baker |
| 3,768,582 | 10/73 | Phillippe |
| 3,947,065 | 3/76 | Geiger |

PUBLICATIONS

University of Maryland Wind Tunnel Reports Nos. 85, 98 and 150, December 20, 1976.

W. T. Mason, Jr., "Wind Tunnel Development Of The Dragfoiler - A System For Reducing Tractor-Trailer Aerodynamic Drag", West Coast Meeting, Seattle, Washington (US), August 11-14, 1975, SAE750705, Society of Automotive Engineers.

After the title

"FOREIGN PATENT DOCUMENTS"

insert the following patent:

77716/75            1/75            Australia

UNITED STATES PATENT AND TRADEMARK OFFICE
CERTIFICATE OF CORRECTION

PATENT NO. : 4,245,862

DATED : January 20, 1981

INVENTOR(S) : Frank T. Buckley, Jr.

It is certified that error appears in the above—identified patent and that said Letters Patent is hereby corrected as shown below:

Column 2, line 40, before the word "rearwardly, delete "the" and insert -- be --.

Column 7, line 2, after the word "lengths", delete "1" and insert --$\ell$--.

Column 7, line 3, delete "long" and insert -- low --.

Column 8, line 64, change "ssurface" to -- surface --.

Column 10, line 56, delete "l>h" and insert --$\ell$>h --.

Column 10, line 61, delete "l>h" and insert --$\ell$>h --.

Column 11, line 12, delete "length l" and insert -- length $\ell$ --.

Column 12, line 16, delete "[at least zero]".

Column 13, line 34, delete the period "." after "β".

Signed and Sealed this

Thirty-first Day of August 1982

[SEAL]

Attest:

GERALD J. MOSSINGHOFF

Attesting Officer    Commissioner of Patents and Trademarks